Patented Dec. 6, 1938

2,139,008

UNITED STATES PATENT OFFICE 2,139,008

COATING COMPOSITION

George R. Ensminger, New Brunswick, N. J., assignor to E. I. du Pont de Nemours & Company, Wilmington, Del., a corporation of Delaware No Drawing. Application August 6, 1936, Serial No. 94,635

5 Claims. (Cl. 134—79)

This invention relates to improved cellulose nitrate coating compositions, and more particularly to cellulose nitrate-methacrylate resin combinations which afford desirable improvements with respect to resistance to "chalking" and "bronzing" during exposure to atmospheric conditions.

Conventional cellulose nitrate enamels, especially those containing substantial quantities of white and/or blue pigments, commonly used in the finishing industry, and more particularly for the finishing of automobiles where they are exposed to deteriorating atmospheric conditions, are characterized by very undesirable "chalking" and/or "bronzing" effects, which rapidly destroy the original beauty and life of the finish. Enamels containing appreciable quantities of the more commonly used white pigments, such as zinc oxide, Titanox, Timonox, titanium oxide, etc., have an inherent tendency to chalk on exposure to the weather. This property is essentially a surface effect due to a gradual superficial disintegration of the protective film thus releasing the pigment particles. A finish which chalks badly seldom meets the requirements for durability. In addition, a dull, lifeless appearance is presented and the finish can only be restored to its original condition by repeated washing and polishing. Since in recent years the trend has been toward lighter and brighter colors, it is particularly desirable that compositions utilized commercially be improved in this respect.

"Bronzing" is frequently encountered in blue finishes which contain preponderant quantities of iron blue pigments, and is sometimes observed in finishes which contain certain green, maroon or red pigments. The effect is one of a gradual development on exposure of the finish of a metallic sheen, bronze-like in character, which adversely affects the true color, gloss and life of the original finish.

Considerable investigational work has been done in attempting to eliminate these defects. Some success has been attained in reducing chalking tendencies by the use of certain white pigments which inherently chalk less than others, but the improvements following such substitutions have not been of the magnitude desired. The cause and cure for "bronzing" tendencies have been more difficult of solution, since considerable variance in results is noticeable even when extra precautions are taken to insure uniformity in controllable factors during manufacture of the pigment.

This invention has as an object the provision of an improved cellulose nitrate coating composition which is characterized by the elimination or substantial reduction of "chalking" and/or "bronzing" tendencies heretofore generally encountered when finishes prepared from cellulose nitrate compositions are exposed to the weather or other erosive conditions. Another object is the provision of a cellulose nitrate composition which is capable of producing a film that will more effectively retain its original gloss during the life of the finish. A further object of the invention is the provision of a cellulose nitrate composition which affords greater durability for finishes when subjected to outdoor exposure. Other objects will become apparent as the description of the invention proceeds.

These objects are accomplished by the use, in combination with cellulose nitrate, of certain polymerization products of acrylic acid or its derivatives, and pigments which normally tend to chalk or bronze, in manufacturing coating compositions generally applicable for automotive and industrial finishing purposes, and particularly suited for finishing objects which are subjected to atmospheric conditions.

The following examples are given by way of illustration only and no limitations are intended thereby, since modifications will occur to those skilled in the art which will fall within the scope of the present invention.

Example 1—White enamel

|   | Per cent |
|---|---|
| Leaded zinc oxide | 11.25 |
| Methacrylate resin solution* | 21.40 |
| Cellulose nitrate (viscosity ½ sec.) | 15.00 |
| Ethyl alcohol (denatured) | 14.20 |
| Ethyl acetate | 15.20 |
| Toluol | 6.35 |
| Butyl acetate | 5.10 |
| Dibutyl phthalate | 5.00 |
| High solvency petroleum hydrocarbon | 3.30 |
| Castor oil | 3.20 |
|   | 100.00 |

*35% solution of isobutyl methacrylate resin in toluol.

The enamel composition is prepared by first dispersing the pigment in a suitable portion of the synthetic resin solution, adjusted by the addition of solvents and diluents, in such proportions as to permit working the mass in a ball mill, kneading machine, or other suitable device. This pigmented intermediate is then placed in an ordinary paddle mixer together with the remaining ingredients in the proportions indicated, and the mixture thoroughly agitated until a homogeneous enamel is obtained.

*Example 2—Blue enamel*

|  | Per cent |
|---|---|
| Chinese blue pigment | 7.00 |
| Zinc oxide | .80 |
| Methacrylate resin solution* | 21.40 |
| Cellulose nitrate (viscosity ½ sec.) | 15.00 |
| Ethyl alcohol (denatured) | 14.47 |
| Ethyl acetate | 17.93 |
| High solvency petroleum hydrocarbon | 9.23 |
| Dibutyl phthalate | 5.00 |
| Castor oil | 3.20 |
| Butyl acetate | 3.10 |
| Butyl alcohol | 2.47 |
| Citric acid | .40 |
|  | 100.00 |

* 35% solution of isobutyl methacrylate resin in toluol.

The enamel may be prepared by the method described for Example 1 which involves dispersion of the pigment in the synthetic resin solution, followed by the addition of the remaining ingredients of the composition, but it is preferably prepared according to the process outlined in the co-pending application of Robert T. Hucks, Serial No. 91,965, filed July 22, 1936, which involves kneading of the pigment in a water suspension with water wet cellulose nitrate and suitable oils and plasticizers, whereby the pigment is transferred from the water suspension simultaneously with the colloiding of the cellulose nitrate, after which the water is separated.

In Example 1, the use of leaded zinc oxide as the pigment ingredient is indicated. It has been found that the compositions of this invention likewise inhibit chalking of other white pigments, such as antimony oxide, titanium oxide, zinc oxide, zirconium oxide, "Timonox", "Titanox", barium, zinc and lead titanates, etc. Therefore, the new compositions may be used to advantage as vehicles for these pigments or combinations of two or more white pigments or in enamel products where the white pigment predominates, but where colored pigments are also present to afford the so-called pastel shades, which are frequently characterized by excessive chalking in previously available cellulose nitrate vehicles.

It was also discovered that the vehicles of the present invention are particularly effective in reducing bronzing tendencies of iron blue pigments, such as Chinese, Prussian and Milori blues as illustrated in Example 2. The small proportion of zinc oxide shown in this example is included to assist in developing the desired color. Other pigments may be used in conjunction with the blue pigment in preparing this enamel although conventional methods usually provide for the manufacture of single pigment enamels, from which any desired color may be developed by proper mixing of these so-called "tinting solutions".

Maximum chalk resistance for compositions of the type illustrated above is obtained when the resin is present in amounts ranging from equal parts of cellulose nitrate and resin to half as much resin as cellulose nitrate. The plasticizer may vary from ⅕ to ½ of the amount of cellulose nitrate although these ratios may vary even outside of these ranges depending upon the characteristics of the plasticizer and resin. If the proportion of resin is increased beyond the range given above, there will be some improvement with respect to chalk resistance and bronzing but difficulties will be encountered in sanding, rubbing, and polishing. In general, the amount of resin required for correcting bronzing tendencies is less than the amount required to provide chalk resistance in compositions containing pigments which ordinarily chalk excessively during exposure.

The types and proportions of solvents and diluents shown in the above examples may be varied over a considerable range and the substitution of an equivalent material or a change in proportions to suit conditions of application or other special requirements is considered within the ordinary practice of one skilled in the art. The same applies to the plasticizer ingredient of the examples illustrated, although the plasticizer ratio should be maintained within the limits indicated.

Cellulose nitrate of low viscosity characteristic is preferred as indicated in the examples. However, the use of cellulose nitrates of higher viscosity characteristics is not prohibitive, since the several advantages hereinafter described likewise accrue.

The resin constituent of the new compositions is preferably a polymerization product of propyl, butyl, isobutyl, etc., naphthenyl or alicyclic methacrylates, such as cyclohexyl and methoxycyclohexyl methacrylates, although the higher alcohol esters such as the hexyl, heptyl, octyl, etc. of methacrylic acid, and the ester, amide, amine, imine, etc. derivatives of acrylic acid are likewise suited. In general, polymerized organic derivatives of an acrylic acid, the acid being represented by the general formula

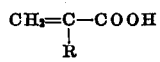

where R is an alkyl radical, may be used. Polymerized methacrylate esters in general are acceptable, providing they offer satisfactory compatibility characteristics in the compositions of this invention. Methyl and ethyl methacrylates are of relatively high viscosity and impart high viscosity to cellulose nitrate solutions and hence, are less preferred to the methacrylate compounds of the higher carbon alcohols of the straight chain paraffin series. The viscosity characteristic of the polymeric alkyl methacrylates is determined to some extent by the methods employed for their polymerization.

At the present stage of development of the methacrylate resins, the methyl and ethyl compounds are relatively impractical for use in the cellulose nitrate compositions described above because of the excessively high viscosities which usually characterize these combinations. In addition the degree of chalk resistance secured from compositions based on these resins is not as great as when the higher alcohol esters are employed.

The preparation of monomeric methacrylate esters is described in the co-pending application of D. J. Loder, Serial No. 593,411. The polymerization of the ester is effected by well-known methods, as for instance with the aid of light, heat, catalysts, such as organic peroxides, etc.

The use of other synthetic and natural resins such as phenol-formaldehyde resins, modified alkyd resins, urea-formaldehyde resins, dammar, ester gum, etc., is not precluded provided they are compatible with the other ingredients of the enamel, but in many instances if such resins are substituted for part of the methacrylate, the degree of resistance to chalking and bronzing is correspondingly reduced.

The invention is not only applicable to correcting bronzing tendencies during exposure of enamels prepared from iron blue pigments where such tendency is generally of greater degree, but it is also operative in eliminating or reducing this tendency in enamels prepared from other pigments which exhibit this tendency, such as certain red, maroon and green pigments.

In certain maroon enamels containing appreciable amounts of some types of synthetic resins, considerable "bronze" has developed immediately following conventional buffing and polishing practices, particularly as applied in the finishing of automobiles. In the maroon enamels of the present invention, however, this defect is not generally encountered and they are, therefore, of greater interest in the automotive industry because of this desirable property.

The compositions are generally useful in coating and finishing surfaces which are to be exposed to the destructive forces of the elements. They are of particular merit in finishing automobiles where unusually destructive climatic conditions are frequently encountered and where conventional enamels widely used in this industry fail in a relatively short time. The enamels of the present invention have already proven their value for extended exposure periods.

The coating compositions of the present invention are characterized by extraordinary life and durability, thus affording obvious economies for the consumer. Chalking and bronzing defects are eliminated or greatly reduced, and as a result the true color and original gloss of the finish are retained over a greater period. Ordinary films require frequent cleaning and polishing to retain a satisfactory appearance. However, with a finish produced from the composition of the present invention, this labor is reduced to a minimum, and a finish is secured which resists flaking, cracking, and peeling to a very high degree. In adapting the new enamels commercially, no changes in production operations are required, since sanding, rubbing and polishing of the finish are accomplished in the same manner and with the expenditure of no more time and effort than formerly required for finishes produced from the conventional type enamels.

It is apparent that many different embodiments of this invention may be made without departing from the spirit and scope thereof and it is, therefore, not intended to be limited except as indicated in the appended claims.

I claim:

1. A pigmented coating composition, a dry film of which remains free from chalking and bronzing under prolonged exposure to atmospheric conditions, comprising cellulose nitrate, a polymerized organic derivative of acrylic acid selected from the class consisting of amides, amines, imines, and aliphatic, aromatic and alicyclic esters of acrylic acid, said cellulose nitrate being present in amount between one and two times the amount of the organic polymer present and a substantial amount of pigment which in such amount normally chalks or bronzes in a film consisting of cellulose nitrate.

2. The composition of claim 1 in which the acrylic acid derivative is the iso-butyl ester of methacrylic acid.

3. The composition of claim 1 in which the acrylic acid derivative is the cyclohexyl ester of methacrylic acid.

4. Composition of claim 1 in which the acrylic acid derivative is a polymeric ester of methacrylic acid, and the said cellulose nitrate and acrylic acid derivative are present in approximately equal amounts.

5. Composition of claim 1 in which the acrylic acid derivative is an acid represented by the general formula

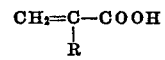

where R is an alkyl radical.

GEORGE R. ENSMINGER.